(12) United States Patent
Di Carlo et al.

(10) Patent No.: US 10,690,290 B2
(45) Date of Patent: Jun. 23, 2020

(54) PARTICLE FOCUSING SYSTEMS AND METHODS

(71) Applicant: THE REGENTS OF THE UNIVERSITY OF CALIFORNIA, Oakland, CA (US)

(72) Inventors: Dino Di Carlo, Los Angeles, CA (US); Wonhee Lee, Daejeon (KR)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 16/276,974

(22) Filed: Feb. 15, 2019

(65) Prior Publication Data

US 2019/0178449 A1 Jun. 13, 2019

Related U.S. Application Data

(63) Continuation of application No. 13/988,282, filed as application No. PCT/US2011/060573 on Nov. 14, 2011, now abandoned.
(Continued)

(51) Int. Cl.
*G01N 15/14* (2006.01)
*F17D 1/00* (2006.01)

(52) U.S. Cl.
CPC ........... *F17D 1/00* (2013.01); *G01N 15/1404* (2013.01); *G01N 2015/1415* (2013.01); *Y10T 137/85978* (2015.04)

(58) Field of Classification Search
CPC ................. F17D 1/00; G01N 15/1404; G01N 2015/1415; Y10T 137/85978
See application file for complete search history.

(56) References Cited

U.S. PATENT DOCUMENTS

| 2003/0178641 | A1 | 9/2003 | Blair et al. |
| 2008/0317632 | A1 | 12/2008 | Shimasaki et al. |
| 2009/0142846 | A1* | 6/2009 | Crenshaw ............. B01F 5/0646 436/34 |

FOREIGN PATENT DOCUMENTS

WO WO2008130977 A2 10/2008

OTHER PUBLICATIONS

PCT International Search Report for PCT/US2011/060573, Applicant: The Regents of the University of California, Form PCT/ISA/210 and 220, dated May 30, 2012 (6pages).
(Continued)

*Primary Examiner* — Dennis White
(74) *Attorney, Agent, or Firm* — Vista IP Law Group LLP

(57) ABSTRACT

A particle focusing system includes an inlet; an inertial focusing microchannel disposed in a substrate and connected to the inlet; and a pressure/flow source configured to drive a particle-containing fluid through the inertial focusing microchannel, where the inertial focusing microchannel includes a side wall having an irregular surface. The side wall includes a first irregularity protruding from a baseline surface away from a longitudinal axis of the inertial focusing microchannel. Alternatively or additionally, the first irregularity and the baseline surface form an angle more than or equal to 135 degrees. The inertial focusing microchannel may have a substantially rectangular cross-section having a height and a width, and a ratio of height to width is approximately 5:4 to 4:1. The system may also include a downstream expanding region having a side wall, where the side wall has a stepped surface.

10 Claims, 9 Drawing Sheets

Related U.S. Application Data

(60) Provisional application No. 61/415,059, filed on Nov. 18, 2010.

(56) References Cited

OTHER PUBLICATIONS

PCT Written Opinion of the International Search Authority for PCT/US2011/060573, Applicant: The Regents of the University of California, Form PCT/ISA/237, dated May 30, 2012 (7 pages).
Di Carlo, Dino et al., Continuous inertial focusing, ordering, and separation of particles in microchannels. Proc. Natl. Acad. Sci. U.S.A. 104(48):18892-18897 (2007).
Hur, Soojung Claire et al., Sheathless inertial cell ordering for extreme throughput flow cytometry. Lab Chip 10(3):274-280 (2010).
Lee, Wonhee et al., "Dynamic self-assembly and control of microfluidic particle crystals," PNAS Dec. 28, 2010, vol. 107. No. 52, pp. 22413-22418.
Matas, Jean-Philippe et al., Trains of particles in finite-Reynolds-number pipe flow. Phys. Fluids 16(11):4192-4195 (2004).
Russom, Aman et al. "Differential inertial focusing of particles in curved low-aspect-ratio microchannels," New Journal of Physics. Jul. 31, 2009, vol. 11, 075025.
Segre, G et al., Behaviour of macroscopic rigid spheres in Poiseuille flow Part 2. Experimental results and Interpretation. Journal of Fluid Mechanics Digital Archive 14:136-157 (1962).
Segre, G et al., Radial particle displacements in Poiseuille flow of suspensions. Nature 189(476):209-210 (1961).
Whitesides, George M. et al., Self-assembly at all scales. Science 295(5564):2418-2421 (2002).
PCT International Preliminary Report on Patentability (Chapter I of the Patent Cooperation Treaty) for PCT/US2011/060573, Applicant: The Regents of the University of California, Form PCT/IB/326 and 373, dated May 30, 2013 (9 pages).
Grzybowski BA & Campbell CJ Complexity and dynamic self-assembly. Chem. Eng. Sci. 59(8-9):1667-1676 (2004).
Decision on Appeal dated Dec. 18, 2018 in U.S. Appl. No. 13/988,282, filed May 17, 2013, Inventor: Dino Di Carlo (21 pages).

\* cited by examiner

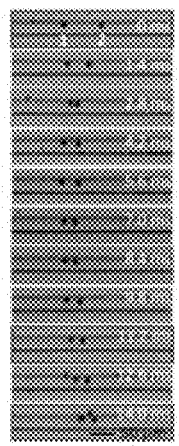 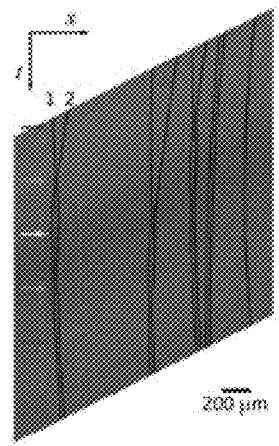 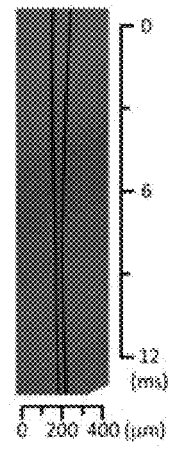
Fig. 2A  Fig. 2B  Fig. 2C
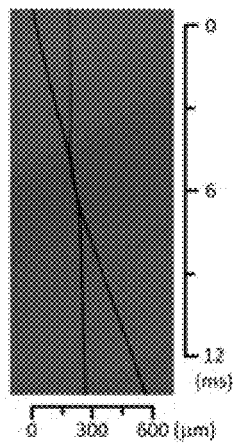 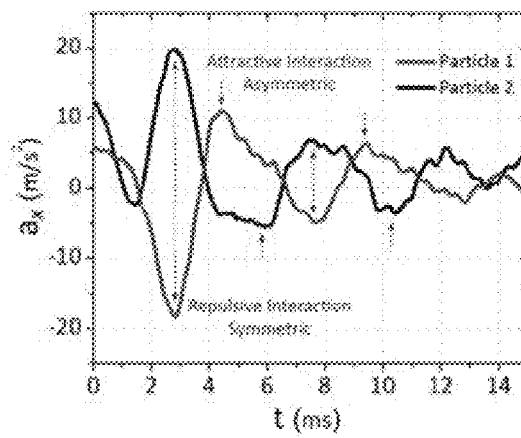
Fig. 2D  Fig. 2E
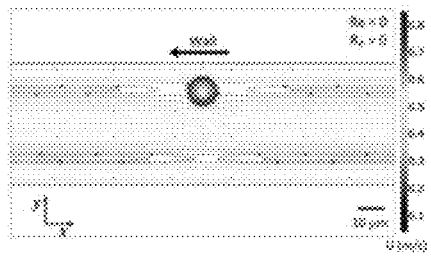 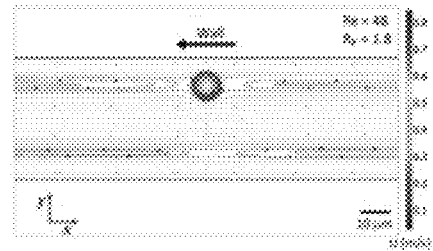
Fig. 3A  Fig. 3B

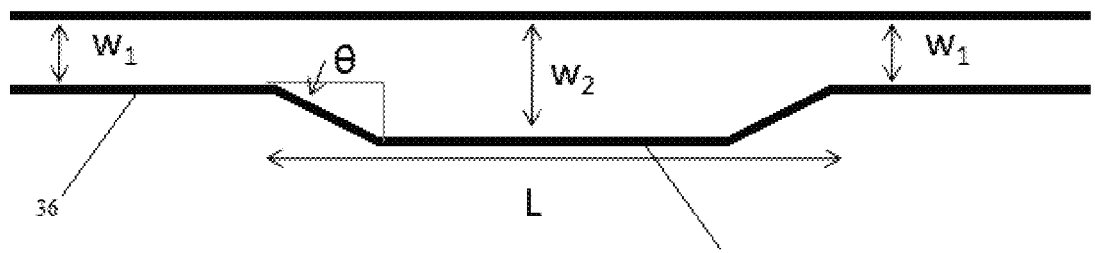
Fig. 6
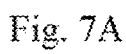
Fig. 7A
Fig. 7B
Fig. 7C
Fig. 7D
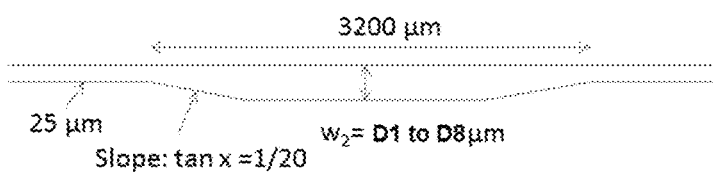 
Fig. 8A

|   | N | σ (μm) |
|---|---|---|
| A | 207 | 6.2 |
| B | 190 | 5.4 |
| C | 202 | 5.4 |
| D | 222 | 5.0 |
Fig. 11E
Fig. 12A
Fig. 12B
Fig. 12C
Fig. 12D

PARTICLE FOCUSING SYSTEMS AND METHODS

RELATED APPLICATION

This Application is a continuation of U.S. patent application Ser. No. 13/988,282 filed on May 17, 2013, which itself is a U.S. National Stage filing under 35 U.S.C. § 371 of International Application No. PCT/US2011/060573, filed Nov. 14, 2011, which claims priority to U.S. Provisional Patent Application No. 61/415,059 filed on Nov. 18, 2010. The contents of the aforementioned applications are hereby incorporated herein by reference in their entirely. Priority to the aforementioned applications are hereby expressly claimed in accordance with 35 U.S.C. §§ 119, 120, 365 and 371 and any other applicable statutes.

STATEMENT REGARDING FEDERALLY SPONSORED RESEARCH AND DEVELOPMENT

This invention was made with government support under Grant Number 0930501, awarded by the National Science Foundation. The government has certain rights in the invention.

FIELD OF THE INVENTION

The field of the invention generally relates to systems used to focus, separate, manipulate, and analyze particles or cells. More particularly, the invention relates to microfluidic-based systems that focus, separate, manipulate, and/or analyze biological materials (e.g., cells or cellular components) or particles.

BACKGROUND

Inertial microfluidic systems have shown great potential for miniaturization of flow cytometry by removal of the sheath flow while maintaining high throughput (approximately 1 m/s). Force fields such as acoustic, electric, magnetic fields can also be used to manipulate particles within flow. However, efficiencies of these force field mediated methods degrade with increasing flow rate, which in turn limits the throughput (to approximately 0.1-1 mm/s). In inertial microfluidic systems, particles are laterally focused to a few distinct equilibrium positions and ordered with regular spacing, which is determined by the particle Reynolds number. There has been no report of control of particle spacing in flows.

Microscale particles in flow can be found in many fields of science and technology. One example is cells in the blood stream. Thus, control of particle motion/position in flow has numerous applications. "Local concentration" at microfluidic scale deviates from bulk concentration; with small sample volume standard deviation can be comparable to the mean of population. Most relevant application areas that can benefit from ordered particle streams include flow cytometry, cell printing, and metamaterial synthesis.

Inertial migration of particles in finite-Reynolds-number flow has been extensively studied experimentally and theoretically since the "tubular pinch" effect was experimentally first reported in 1961 by Segré and Silberberg. A rather unknown fact is that Segré and Silberberg also noted that particles tended to align in "necklaces" in the flow direction while remaining focused to an annulus. This dynamic self-assembly phenomenon was recently revisited in macroscale and microscale channel systems. Although a scaling of inter-particle spacing with fluid inertia was observed recently, little is known concerning the mechanism of particle self-assembly.

Samples for flow cytometers are suspended cells, which aligned with pinched flow and pass through optical sensing region. Focusing of particle using inertial microfluidic system can have accuracy better than ~0.1 µm and operate without pinch flow thereby enabling parallelization. Sensing efficiency and throughput can be enhanced by uniform spacing because sensing signal in frequency domain will have narrow bandwidth, the particle stream will not have overlaps, and empty space can be reduced. There has been no techniques utilizing channel geometry to reduce hydrodynamic interaction.

SUMMARY

In one embodiment, a particle focusing system includes an inlet; an inertial focusing microchannel disposed in a substrate and connected to the inlet; and a pressure/flow source configured to drive a particle-containing fluid through the inertial focusing microchannel, where the inertial focusing microchannel includes a side wall having an irregular surface. Optionally, the side wall includes a first irregularity protruding from a baseline surface away from a longitudinal axis of the inertial focusing microchannel. Alternatively or additionally, the first irregularity and the baseline surface form an angle more than or equal to 135 degrees. The inertial focusing microchannel may have a substantially rectangular cross-section having a height and a width, and a ratio of height to width is approximately 5:4 to 4:1. The system may also include a downstream expanding region having a side wall, where the side wall may have a curved or stepped surface.

In some embodiments, the side wall also includes a second irregularity protruding from the baseline surface away from a longitudinal axis of the inertial focusing microchannel, where the first irregularity and the second irregularity have different shapes. Each irregularity may have a shape selected from the group consisting of trapezoidal, triangular, rounded, and rectangular. In other embodiments, the inertial focusing microchannel also includes a first section having first irregularities protruding from the baseline surface away from a longitudinal axis of the inertial focusing microchannel and a second section having second irregularities protruding from the baseline surface away from a longitudinal axis of the inertial focusing microchannel, and where the first irregularities are axially shorter than the second irregularities. In still other embodiments, the side wall includes a plurality of irregularities protruding from a baseline surface away from a longitudinal axis of the inertial focusing microchannel. In some of those embodiments, at least two irregularities are axially separated from respective next irregularities by different axial distances and/or different shapes. In yet other embodiments, the system also includes an additional inlet.

In another embodiment, a particle analyzing system includes an inlet; an inertial focusing microchannel disposed in a substrate and connected to the inlet; a pressure/flow source configured to drive a particle-containing fluid through the inertial focusing microchannel; and a particle analyzer disposed adjacent a distal end of the inertial focusing microchannel and configured to analyze particles in the distal end of the inertial focusing microchannel, where the inertial focusing microchannel includes a side wall having an irregular surface. Optionally, the side wall includes a first irregularity protruding from a baseline surface away from a longitudinal axis of the inertial focusing microchannel. Alternatively or additionally, the first irregularity and the baseline surface form an angle more than or equal to 135 degrees. The inertial focusing microchannel may have a substantially rectangular cross-section having a height and a width, and a ratio of height to width is approximately 5:4 to 4:1.

In some embodiments, the side wall also includes a second irregularity protruding from the baseline surface away from a longitudinal axis of the inertial focusing microchannel, where the first irregularity and the second irregularity have different shapes. Each irregularity may have a shape selected from the group consisting of trapezoidal, triangular, rounded, and rectangular. In other embodiments, the inertial focusing microchannel also includes a first section having first irregularities protruding from the baseline surface away from a longitudinal axis of the inertial focusing microchannel and a second section having second irregularities protruding from the baseline surface away from a longitudinal axis of the inertial focusing microchannel, and where the first irregularities are axially shorter than the second irregularities. In still other embodiments, the side wall includes a plurality of irregularities protruding from a baseline surface away from a longitudinal axis of the inertial focusing microchannel. In some of those embodiments, at least two irregularities are axially separated from respective next irregularities by different axial distances and/or different shapes. In yet other embodiments, the system also includes an additional inlet.

In yet another embodiment, a method of focusing particles in a fluid into a substantially axially aligned and ordered particle stream includes flowing an unprocessed fluid having particles suspended therein through a particle focusing system, where the particle focusing system includes a first inlet; an inertial focusing microchannel disposed in a substrate and connected to the inlet; and a pressure/flow source configured to drive a particle-containing fluid through the inertial focusing microchannel, where the inertial focusing microchannel includes a side wall having an irregular surface. Optionally, the inertial focusing microchannel has width W, and the fluid has density $\rho$, maximum velocity $U_m$, and viscosity $\mu$, and the unprocessed fluid is flowed through the particle focusing system at a flow rate such that channel Reynolds number, $R_c=\rho U_m W/\mu$, is larger than 1. Flowing unprocessed fluid through the particle focusing system may include flowing the unprocessed fluid over the irregular surface of the microchannel side wall to increase a rate of focusing.

In some embodiments, in which the particle focusing system also includes a second inlet and the unprocessed fluid having particles suspended therein is flowed through the first inlet, the method also includes flowing a particle free fluid through the second inlet simultaneously with flowing the unprocessed fluid through the first inlet. In other embodiments, the side wall includes a first irregularity protruding from a baseline surface away from a longitudinal axis of the inertial focusing microchannel, and flowing the unprocessed fluid over the irregularity increases an inter-particle spacing in the particle stream. In still other embodiments, the inertial focusing microchannel also includes a first section having first irregularities protruding from the baseline surface away from a longitudinal axis of the inertial focusing microchannel and a second section having second irregularities protruding from the baseline surface away from a longitudinal axis of the inertial focusing microchannel, where the first irregularities are axially shorter than the second irregularities. In such embodiments, flowing unprocessed fluid through the particle focusing system may include flowing the unprocessed fluid through the first section to increase a rate of focusing and flowing the unprocessed fluid through the second section to tune a particle frequency of the particle stream.

BRIEF DESCRIPTION OF THE DRAWINGS

FIG. 2A is a series of high-speed microscopy images of a particle pair flowing through a microchannel according to one embodiment of the invention.

FIG. 2B-FIG. 2D are transformed to x-t graphs from captured movies of particle pairs flowing through microchannels according to various embodiments of the invention.

FIG. 2E is a plot of the acceleration of the first particle pair marked with the dotted line in FIG. 2B.

FIG. 3A and FIG. 3B are diagrams showing simulated flow around a sphere at zero-Reynolds number and finite-Reynolds number, respectively.

FIG. 6 is a schematic view of an expansion region in a microchannel according to one embodiment of the invention.

FIG. 7A-FIG. 7D are schematic views of microchannel side walls having irregularities according to various embodiments of the invention. FIG. 7C and FIG. 7D have insets detailed schematic views of the irregularities.

FIG. 8A is a schematic view of an expansion region in a microchannel according to various embodiments of the invention and a chart of the widths of various expansion regions.

FIG. 11E is a chart showing standard deviation of the position of particles in FIG. 11A-FIG. 11D.

FIG. 12A-FIG. 12D are transformed t-y images of particles stream in the corresponding expanding regions depicted in FIG. 11A-FIG. 11D.

DETAILED DESCRIPTION OF THE ILLUSTRATED EMBODIMENTS

Self-assembling systems, in general, require multiple interactions that include positive and negative feedback, which for particle systems are realized as attractive and repulsive forces. Viscous reversing wakes, which are induced by confinement, repel neighboring particles to infinity while fluid inertia in the form of lift forces act to maintain the particles at finite distances. This mechanism of dynamic self-assembly of microscale particles in a finite-Reynolds-number channel flow provides parameters for controlling particle stream self-assembling and allow expanded particle control in microchannel systems. Such control is useful for applications such as low-pass spatial filtering of particle spacing. Microfluidic devices can be designed and operated to control particle-particle and particle-wall interactions in order to manipulate inter-particle spacing and reduce defocusing.

Lateral Inertial Focusing of Particles and Longitudinal Self-Assembly to 1-D Trains in Microchannel Flows.

Figure 1A:
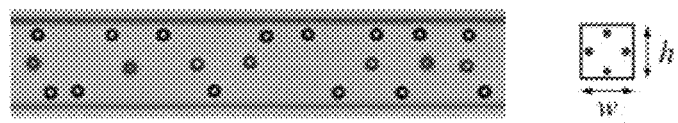
FIG. 1A-FIG. 1C are high-speed microscopy images of particles flowing through microchannels with cross-sectional schematics of the respective microchannels.
Figure 1B:

Although a Stokes flow (i.e. Re=0) assumption is widely accepted in analyzing inertial effects in microfluidic systems, Reynolds numbers in microfluidic channels often reach ~1 and even ~100 in some extreme cases ( $$(Re = \frac{\rho U_m H}{\mu},$$

where $\rho$ is the density of the fluid, $U_m$ is the maximum flow speed, H is the hydraulic diameter, and $\mu$ is the dynamic viscosity of the fluid). Many inertial effects have been observed in microfluidic devices at such Reynolds numbers. One example is inertial migration of particles in square and rectangular channels. As shown in FIG. 1D, randomly distributed particles migrate across streamlines due to inertial lift forces ($F_L$), which is a combination of shear gradient lift that pushes particles towards walls and wall effect lift that pushes particles towards the center of a channel. These inertial lift forces focus particles to four (FIG. 1A) or two (FIG. 1B) dynamic "transverse equilibrium positions" that are determined by channel symmetry. The system is a non-equilibrium system that constantly dissipates energy and the transverse equilibrium position is where the inertial lift forces become zero in the cross-section of the channel. As used herein "focusing position" refers to these transverse equilibrium positions.

While traveling down the channel, the particles are laterally (y and z direction) focused by inertial lift forces ($F_L$) and simultaneously longitudinally (x direction) self-assembled by particle-particle interactions ($F_1$). Focusing occurs along the width and height of a microchannel, and assembling occurs along the longitudinal axis of the microchannel. In the final organized state, the system of particles has two degrees of freedom: inter-particle spacing (l) and focusing position. Inter-particle spacing is determined by flow parameters ($U_m$, $\rho$, $\mu$) and geometric parameters (particle diameter (a), channel width (w), and height (h)). These parameters make up a particle Reynolds number $$(R_p = Re \left(\frac{a}{H}\right)^2)$$

based on the shear, rate at the particle scale, and inter-particle spacing decreases with increasing $R_P$.

Figure 1C:
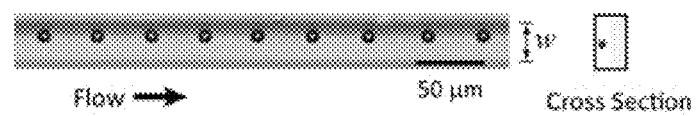
Figure 1D:
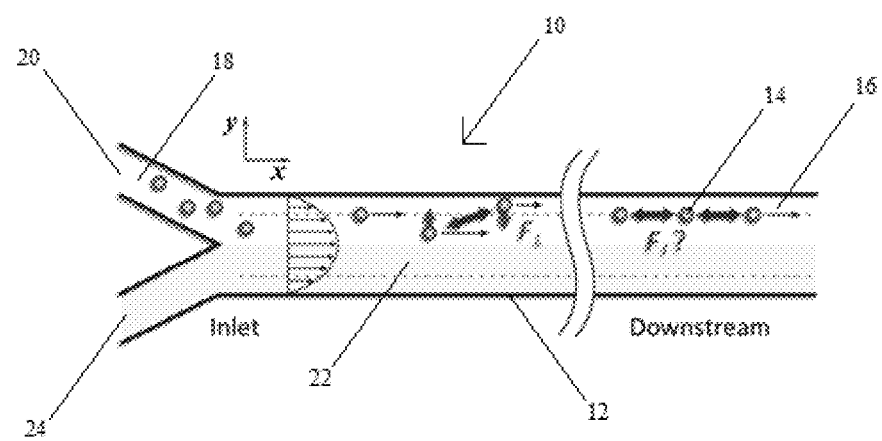
FIG. 1D is a top schematic view of an inertial focusing microchannel according to one embodiment of the invention.

When particles are aligned at one focusing position, there is a default inter-particle spacing for any given set of flow and geometric parameters (FIG. 1C). However, with more than one focusing position, different cross-channel spacing and single-stream spacing appear (FIG. 1A, FIG. 1B). Inter-particle spacing does not show a strong dependence on channel aspect ratio. Note that the selection of a focusing position for particles is intrinsically a random event, which makes diverse patterns in the organized structure. However, additional degrees of freedom in the form of additional focusing positions make the resulting particle stream more complicated.

To obtain a single focusing position, a dual-inlet co-flow system 10 with a rectangular inertial focusing microchannel 12 (FIG. 1D, FIG. 9C, and FIG. 10) can be used. Such a system 10 reduces the degrees of freedom by focusing the particles 14 into a single substantially axially aligned stream 16 (FIG. 1C and FIG. 1D). Unprocessed, particle-containing fluid 18 is flowed through the "upper" (all microchannel views are from above the microchannel such that differences in position along the channel cross-sectional width can be visualized) inlet 20. Particle-free fluid 22 is flowed through the "lower" inlet 24. As a result, particle-free fluid 22 flows through in the "lower" half of microchannel 12 and particles 14 are confined to the "upper" half of the microchannel 12 so that the particles 14 align at one focusing position 16. This organized state becomes a 1-D system in which inter-particle spacing is a dependent variable (on flow and geometric parameters).

FIG. 1A-FIG. 1D show dynamic particle self-assembly in finite-Reynolds number flow. Inertial migration focuses particles to transverse equilibrium positions. Particles migrate to defined equilibrium positions, typically four in a square channel (FIG. 1A) and two in a rectangular channel (FIG. 1B). Particles are not only laterally focused (in y-z plane) but also longitudinally ordered (in x direction) as shown in FIG. 1C. Co-flowing with particle-free fluid confines particles on one side of a microchannel resulting in a single line of particles with regular spacing. FIG. 1D is a schematic view of a dynamic self-assembling particle system including a two-inlet microfluidic channel. Randomly distributed particles are self-assembled through inertial lift forces ($F_L$) and hydrodynamic particle-particle interactions ($F_I$).

Pair Dynamics of Self-Assembly.

Details of the self-assembly process can be observed from the dynamics of pair and multi-particle interactions. FIG. 2A shows dynamics of interactions between two spherical particles. Captured movies were transformed to x-t graphs (FIG. 2B-FIG. 2D) to visualize the dynamics of the particle-particle interaction. The transformed x-t graph represents the particles' positions (x axis) in a translating reference frame over time (y axis).

Figures 4A, 4B, 4C, 4D:
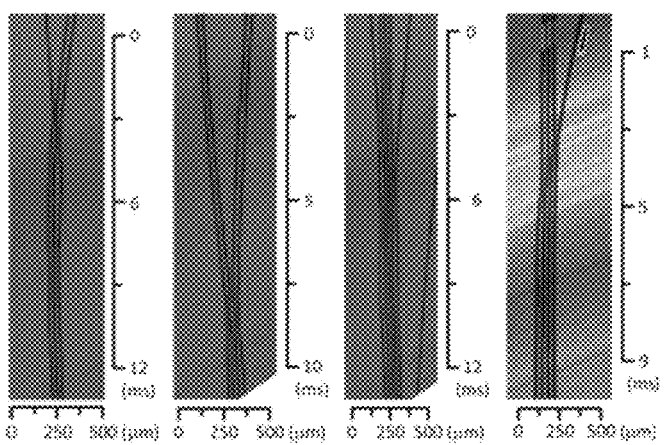
FIG. 4A-FIG. 4D are transformed to x-t graphs from captured movies of particle trains flowing through microchannels according to various embodiments of the invention.
Figure 4E:
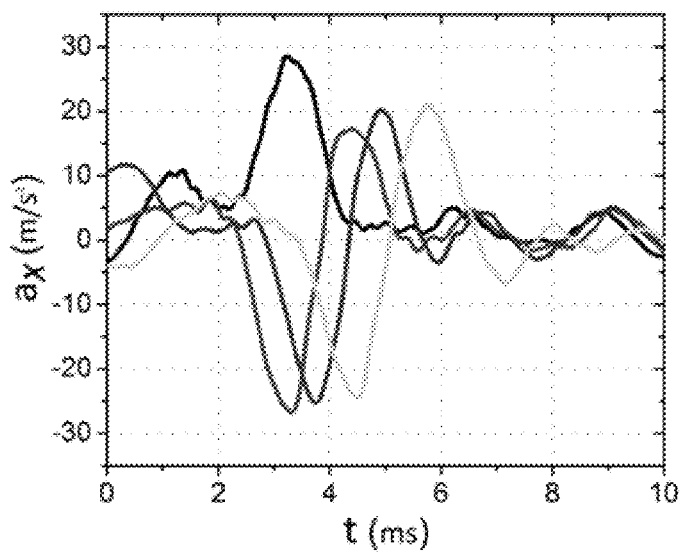
FIG. 4E is a plot of the acceleration of the particles in FIG. 4D.

Particle motion can be captured with a high speed camera (Phantom V7.3) at up to 100,000 frame/s rate. To study the interaction between particles, it is necessary to follow the particle motion as long as possible. Therefore a low magnification objective lens can be used to achieve a large field of view, while sacrificing resolution. The ×2 magnification objective lens allowed an 8.8 mm wide field of view. With a typical flow rate of ~80 μL/min in a 25 μm×90 μm channel, particles move across the entire field of view in approximately 14 ms. Videos can be taken at ~5 mm downstream from the inlet, at which point the particles are mostly at the same y-position but not fully focused yet (at different z-positions). Captured movie frames are combined to build a 3-D stack (x-y-t) with Image J. Then the 3-D stack is re-sliced in the x-t plane. With the choice of y equal to the focusing position, the result is a particle trajectory in x-t plane (FIG. 2B-FIG. 2D, FIG. 4A-FIG. 4D, and FIG. 5B). Graphs showing particle dynamics, as in FIGS. 2E and 4E, are achieved by skewing the x-t image horizontally, which is equivalent to a coordinate transformation of x'=x−vt $$(v = \frac{\Delta x}{\Delta t} = \tan\theta,$$

where θ is the skewed angle).

Initially, particles at the inlet move with different speeds because they are randomly distributed over a parabolic velocity profile. Due to differences in speed, a faster particle approaches a slower particle and forms a particle pair that moves down-stream together. Particle pairs show various dynamics when the distance between the two particles is small enough (<~100 μm) for the particle-particle interaction to become significant. The channel dimensions used in these results was 25 μm×90 μm (w×h) and the particle diameter was 9.9 μm. In FIG. 2B, four particle pairs and a single particle are shown. Particle pairs undergo a variety of behaviors including oscillatory motion in the x direction before they settle to an organized, i.e., focused and ordered, state.

Dynamics of pair-wise particle interactions demonstrate the irreversibility of self-assembly with distinct non-symmetric attractive and symmetric repulsive interactions. Particles entering the system have slightly different speeds, as evidenced by different slopes of the lines in FIG. 2B-FIG. 2E. These different initial conditions (e.g., speed and y, z positions) are observed to lead to differences in dynamics including the amplitude and frequency of oscillation, but yield identical final ordered conditions. The oscillation in inter-particle spacing contains features similar to those of a particle oscillating in a potential well.

Detailed features of the dynamics become apparent when observing the acceleration (FIG. 2E) of a particle pair marked with the dotted line in FIG. 2B. There are two important aspects of the interaction that can be found from this graph. First, the peak heights decrease over time indicating dissipation of energy and irreversibility. Once particles settle to an organized state with constant inter-particle spacing, this condition is maintained without external disturbance. This organized state is only achievable within a moving fluid that requires a constant external energy source (pressure gradient across the resistive microchannel). This aspect of dynamic self-assembly differs from static self-assembly.

Secondly, acceleration patterns for repulsion and attraction are different. The first acceleration peak of particle 1 (lagging particle) and particle 2 (leading particle) are synchronous and correspond to a repulsive interaction. However, the second peaks, corresponding to an attractive interaction, are asynchronous. This off-set results from the lagging particle first catching up followed by the leading particle slowing down. Note that this acceleration pattern repeats in the following peaks as well (FIG. 2E). Another feature observable in FIG. 2E is that there is an off-set for the baseline of the acceleration curves, which means there is an overall acceleration in the positive x-direction. A slow change in the slope, i.e., overall curvature as seen in FIG. 2B, indicates continued particle migration towards focusing positions. FIG. 2C and FIG. 2D show different types of possible interactions that can lead to a consistent self-assembled state. In FIG. 2C, particles are self-assembled without oscillations analogous to a critically damped oscillation. In FIG. 2D, particles do not form a self-assembled pair but pass by each other. Nevertheless, particles interact; the speed of each particle changes during the interaction (at ~4.5-7 ms) and the speed before the interaction and after the interaction are different and not symmetrical. Time reversal symmetry is broken in all cases due to finite inertia.

FIG. 2A is a series of high-speed microscopy images and FIGS. 2B-2D are reconstructed images, all showing particle positions (Δx) in translating reference frames over time. Different initial conditions result in diverse type of dynamics: oscillation (FIG. 2A and FIG. 2B), slow converging (FIG. 2C), and passing (FIG. 2D). FIG. 2A and FIG. 2B show that, in many cases, two particles undergo oscillatory movement before settling to a stable pair configuration. FIG. 2C shows that, analogous to a critical damped oscillation, particles can settle to an ordered pair without oscillation. FIG. 2D shows that particles can pass each other when their z-position difference is large. FIG. 2E shows the second derivative of particle positions from FIG. 2A and FIG. 2B. Amplitude of peak acceleration decreases in consecutive interactions. Repulsive interaction peaks coincide with each other while attractive interaction peaks are asynchronous.

Origin of Repulsive Interaction.

Viscous reversing wakes are responsible for repulsive interactions between particle pairs. Reversing wakes accompanying rotating particles is a unique and unexpected aspect of flow around a sphere in finite-Reynolds-number shear flow and pressure-driven channel flow. However, reversing streamlines and swapping trajectory particle motion do not require fluid inertia, but can occur in Stokes flow in confined channel geometry. The symmetric reversing wake in Stokes flow thus arises from the reflection of the disturbance flow off the channel boundary and does not require inertia.

FIGS. 3A and 3B show simulated flow around a sphere at zero-Reynolds number and finite-Reynolds number, respectively, using known numerical methods. Zero-Reynolds number simulations are done by setting fluid density equal to zero while keeping the flow rate at 100 μL/min. The simulation results at Re=0 (FIG. 3A) show that recirculation occurs from channel confinement in rectangular channel flow (parabolic shear). The viscous wake reflected off the adjacent wall generates a secondary flow in the y-direction and this effect does not require fluid inertia. FIG. 3B shows that finite-Reynolds number (Re=48) flow yields a similar flow field to zero-Reynolds number flow. A small difference between the Stokes flow case and finite-inertia case is that there is a slight asymmetry in finite-Reynolds-number flow streamlines due to inertial effects, such that the stagnation point seen on the lower half of the channel is shifted in the flow direction.

Figure 3C:
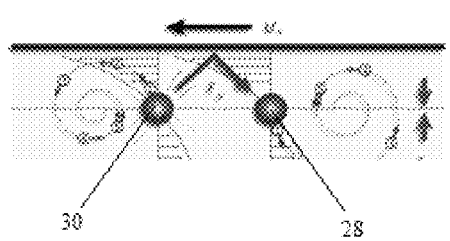
FIG. 3C is a diagram showing reversing flows for a particle pair flowing through a microchannel according to one embodiment of the invention.
Figure 3D:
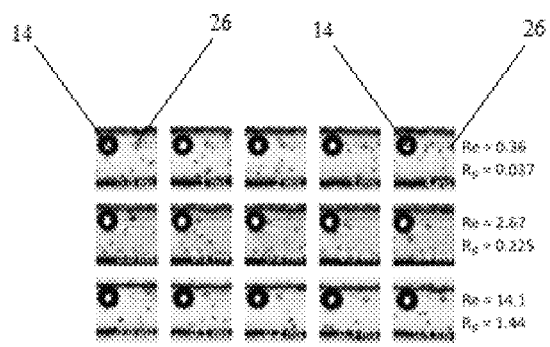
FIG. 3D is a series of high-speed microscopy images of particles and tracer particles in microfluidic flow.

FIG. 3D shows the existence of these reversing flows. To visualize the streamlines, 1 μm tracer particles 26 were added to a suspension of 10 μm particles 14. In the frame of reference of and near larger particles 14, tracer particles 26 are observed to reverse direction. This behavior was observed regardless of particle Reynolds number, in agreement with reversing wakes present in all of the simulation results and showing that reversing flow is predominantly due to the confinement effect.

These results show that fluid inertia has little effect in the repulsive interaction. This repulsive interaction can be used to create mechanisms for dynamic self-assembly consistent with the data. The repulsive interaction initiated by a viscous wake ($F_V$), becomes strong at small inter-particle-spacing (See, FIG. 3C). The viscous wake reflected from the nearby channel wall pushes particles off their focusing positions into staggered y-positions (①). The parabolic flow distribution (background arrows in FIG. 3C) across different y-positions then magnifies inter-particle spacing (②). In other words, particles are pushed apart due to the parabolic velocity distribution (moving in different flow directions in the moving reference frame). FIG. 2A shows that the leading particle 28 moves closer to the center of the channel when it interacts in this repulsion phase. However, particles do not move off to infinity but are pushed back towards focusing positions and trajectories are stabilized by inertial lift ($F_L$) (③). Overshooting leads to multiple oscillation cycles before reaching focusing positions (③ → ④).

FIG. 2E shows an asynchronous attractive interaction in which the lagging particle 30 (particle 1) returns back to focusing position before the leading particle 28 (particle 2). This is consistent with the difference in inertial lift force magnitude on different sides of the inertial focusing position (transverse equilibrium position). The lift force becomes larger nearer to the channel wall where the lagging particle 30 is pushed than near to the channel centerline corresponding to the position of the leading particle 28.

Stable inter-particle spacing is determined by a balance of three components: viscous interaction, parabolic shear flow, and inertial lift force. Particle pairs can have limiting cycles, and thus the possibility of trains of particles with uniform spacing with only reversing wakes. In high aspect ratio channel systems, the viscous interactions decay quickly with inter-particle spacing. When/(inter-particle spacing) is comparable to w, the interactions will decay in a manner similar to that due to a mass dipole near a single wall. That is, the fluid dynamic interaction between particles becomes smaller with increasing/according to the formula $\sim 1/l^2$. When l is larger than w, as in quasi-1D systems, the interactions will decay exponentially.

Figure 3E:
FIG. 3E is a time-sequential image capture of a particle pair entering an expanding region with an inset graph of the average defocusing trajectory±standard deviation (N=8).

Expanding channels can be used to isolate the repulsive viscous interactions from inertial interactions and analyze the balance of these interactions. (See, FIG. 3E and FIG. 3F). FIG. 3E shows a particle pair entering an expanding channel experiencing defocusing due to the viscous reversing wake. In the expanding region particles slow down and move closer due to expanding streamlines. Particles, when in pairs, also move away from the trajectory line of single particles, due to the changing balance between inertial lift and viscous wake effects. At the expanding region, stabilizing inertial lift effects (scaling with $R_p$) decay monotonically, while the viscous swapping interactions initially increase due to decreasing inter-particle spacing. The balance between the interactions is broken and the lagging particle is pushed towards the wall, and the leading particle is pushed away from the wall.

Figure 11A:
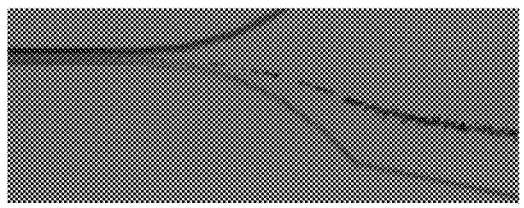
FIG. 11A-FIG. 11D are high-speed microscopy images of particles flowing through an expanded distal end of a microchannel according to various embodiments of the invention.
Figure 11B:
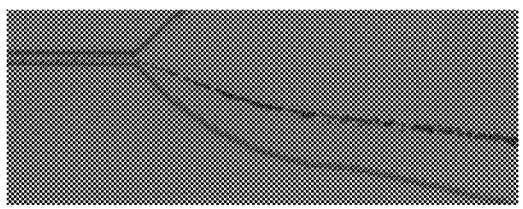
Figure 11C:
Figure 11D:
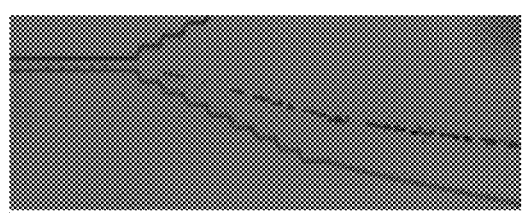

This effect is in agreement with the explanation of pair dynamics (FIG. 3C) and has important practical ramifications for continuous flow particle separation systems operating at low Reynolds numbers. Particle focusing near walls or in expanding channel geometries is used in many microfluidic particle-separation devices. In expansion channels, this effect results in broadening of focused particle or cell streams. (FIG. 11A and FIG. 11B). Particle-particle interactions in high concentration particle suspensions result in defocusing in regions near channel walls, which adversely affects particle separation in microfluidic devices. This defocusing is caused by viscous wakes reflected from channel walls and can be remedied. For instance, with quickly expanding channels such that particles can be positioned away from channel walls. (FIG. 11C and FIG. 11D).

Figure 3F:
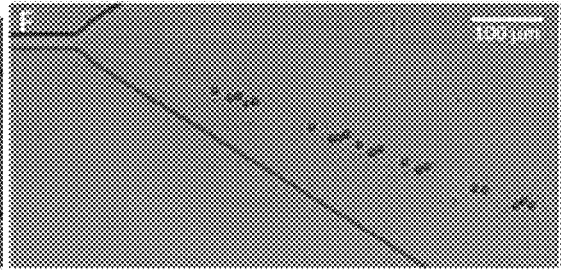
FIG. 3F is a top schematic view of particles entering an expanding region according to one embodiment of the invention.

Additionally, the particle pair interaction is a deterministic behavior (FIG. 3E inset). Therefore, defocusing motion can be controlled by controlling particle concentration and channel geometry. In FIG. 3F, particles are shown to develop unique patterns at the expanding channel. This pattern formation can used for two-dimensional self-assembly of microparticles. Besides implications in microfluidic systems, this effect also has implications for blood flow near vessel walls, suggesting limits to the dimensions of "cell-free layers", and cell and particle diffusion in concentrated suspensions.

FIG. 3A and FIG. 3B show that simulated stream lines for Stokes flow (Re=0) (FIG. 3A) and finite-Reynolds number flow (Re=48) (FIG. 3B) are not significantly different from each other. Reversing flow can occur solely from confinement effects. The channel dimension in the simulation is 45 μm×60 μm and particle diameter is 9.9 μm. Reversing flow is observed over a range of Reynolds numbers (0.36, 2.67, and 14.1) in FIG. 3D. Tracer particles 26 (1 μm diameter) follow reversing stream lines with little disturbance. In agreement with simulation, reversing flow appears at near-zero Reynolds number (0.36). Larger particle 14 size is 9.9 μm in diameter.

FIG. 3C is a diagrammatic view of particle-particle interactions. Major components are (1) viscous wakes reflected off the side wall ($F_V$), (2) inertial lift force ($F_L$), and (3) flow speed distribution (background arrows). Particles are repelled by $F_V$ and stabilized by $F_L$. Flow speed distribution fine-tunes the balance of the interactions. The oscillation is initiated by strong $F_V$ when two particles approach close enough for $F_V > F_L$. FIG. 3E is a time-sequential image capture showing defocusing dynamics of two particles entering an expanding region 32. Average defocusing trajectory±standard deviation (N=8) is shown in the inset in FIG. 3E. Decreasing $R_p$ indicates decreasing inertial interaction. FIG. 3F illustrates that particles develop a unique pattern at an expanding channel with an appropriate particle concentration.

Multi-Particle Dynamics: Formation of Train and Wave Propagation.

Dynamics for more than two particles follows the same mechanism described above for two particles with additional features. Particles develop into trains through a series of self-assembly processes at the particle pair level (FIG. 4). The particle trains elongate through additional particles joining already organized particle pairs or trains of particles. Particle-particle interactions are essentially the same as in two particle interactions (as evidenced by oscillations and acceleration patterns during interaction). The "impact" of a particle joining a train is transferred down the train in these multi-particle systems (FIG. 4D). As shown in FIG. 4E, particle acceleration patterns are mostly identical for particles in the middle of the train during momentum transfer. Therefore, the middle particles only dissipate a small portion of the momentum of the first particle, which again shows a prominent role of reversible viscous interactions in the initial repulsive transfer of momentum down the particle train. This unique wave-like momentum transfer can be used to reveal non-equilibrium phenomena in self-assembled 1-D particle systems as shown with microfluidic crystals. Using the above described system, stable crystals are formed by self-assembly.

FIG. 4A-FIG. 4E depict randomly distributed particles developing into a long train of particles through a series of interactions. In FIG. 4A, a single particle joins a particle pair. In FIG. 4B, two particle pairs join to make a four-particle train. FIG. 4C illustrates train elongation. First, a faster single particle catches up to a three particle train, then, a slower particle joins the other particles. In FIG. 4D, a first particle (black arrow) joins a three-particle train. The "impact" is transferred down the train. FIG. 4E depicts the particle acceleration from FIG. 4D. Acceleration of the last three particles are nearly identical but translated in time displaying an aspect of wave propagation.

Modulation of Spatial Frequency of Particle Trains Using Locally Structured Microchannel.

One of many aspects characterizing Stokes flow is reversibility. In a channel with symmetric changes in geometry (e.g. expansion and contraction), the relative spacing between particles downstream of the geometry change returns to the same value upstream of the geometry change (assuming no collisions occur).

Figure 5A:
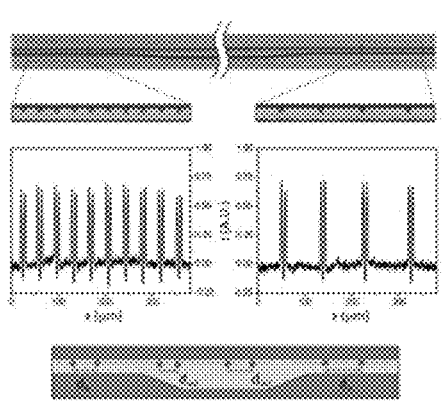
FIG. 5A is a matched series of high-speed microscopy images of particle pairs flowing through microchannels, graphs of locations along the microchannel, and a diagram of the microchannel showing the spatial frequency of ordered particle trains before and after an irregularity.
Figure 5B:
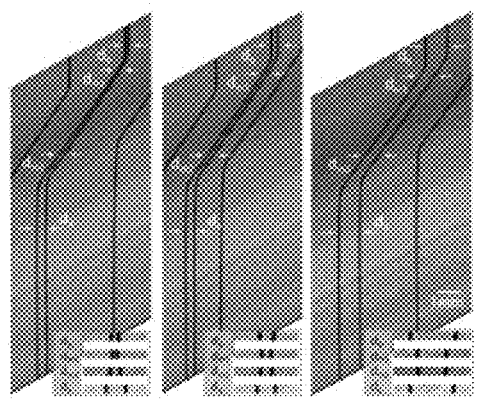
FIG. 5B is a series of transformed to x-t graphs from captured movies of particle pairs flowing through microchannels according to various embodiments of the invention.
Figure 5C:
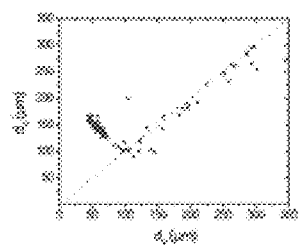
FIG. 5C is scatter plot of inter-particle spacing after an expansion in a microchannel ($d_a$) versus inter-particle spacing before the contraction ($d_a$).
Figure 5D:
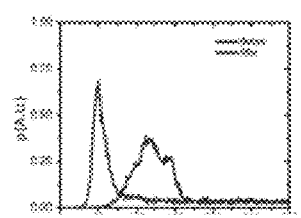
FIG. 5D is a histogram of inter-particle spacing before and after particles pass through an expansion region in a microchannel.

Particle spacing changes in a channel with a symmetric expansion and contraction is shown in FIG. 5A-FIG. 5D. The channel width is 25 μm in the narrow region and 45 μm in the expansion region. The channel height is 85 μm and the length of the expansion region is 2 mm. Unlike the expectation for Stokes flow conditions, inter-particle spacing downstream did not return to its original upstream value. A histogram of inter-particle spacing clearly shows a cut-off and shift of small inter-particle spacing to significantly larger values (FIG. 5D). This shift is possible because while sequences of particle trains exist upstream, there are also large regions with no particles "voids". A shift in particle spacing spreads the localized trains and distributes particles more uniformly to fill in these voids.

Individual particle pairs can be tracked to show changes in inter-particle spacing within the microchannel expansion (FIG. 5B and FIG. 5D). FIG. 5B shows three representative plots of particle pairs with different initial spacing ($d_b$). The large negative slope indicates that the particles entering the expansion region slowed down as expected by conservation of mass. Inter-particle spacing also initially becomes smaller in this region ($d_b > d_{m1}$). Particle pairs with $d_b$ smaller than a threshold value experience a viscous repulsive interaction as shown in FIG. 3C. The increasing inter-particle spacing that follows shows this effect ($d_{m2} > d_{m1}$). Finally, inter-particle spacing becomes larger when particles exit the expansion region consistent with conservation of mass. This entire process is reversible ($d_a = d_b$) for a particle pair with $d_b$ larger than a threshold value (~100 μm for this specific geometry), while the spacing irreversibly increases ($d_a > d_b$) for particle pairs that experience repulsion and reorganization. Below the threshold value $d_b$ and $d_a$ have a negative correlation (FIG. 5D). Smaller $d_b$, thus smaller $d_{m1}$, results in a stronger repulsion in the expansion region that leads to a larger $d_a$. Accordingly, a transient change in channel dimensions can be utilized for modulation of the spatial frequency of particles, working as a passive frequency selective filter.

FIG. 5A-FIG. 5D demonstrate that inter-particle spacing can be manipulated by transiently altering channel width. Unlike in simple Stokes flow, the spatial frequency of ordered particle trains changes when the particles pass through a symmetric expansion-contraction geometry, as shown in FIG. 5A. FIG. 5B is a series of reconstructed high speed images showing pair dynamics in the expansion-contraction geometry, which lead to inter-particle spacing changes. In FIG. 5C, inter-particle spacing after the expansion ($d_a$) are plotted as function of inter-particle spacing before the contraction ($d_a$). The plot in FIG. 5C, demonstrates irreversibility. FIG. 5D is a histogram of inter-particle spacing before and after particles pass through the expansion region. A suspension of 0.05% v/v with 9.9 μm (diameter) beads were flowed at rate of 60 μL/min.

Although only one design is shown, modified dimensions of the expansion region can result in a range of tunable spatial cut-off frequencies. A microfluidic device capable of particle spatial frequency tuning can be used in many practical applications. For example more uniform and controlled particle distributions (as opposed to Poisson distributions) improve efficiency of flow cytometry and single cell encapsulation applications by reducing particle coincidences and zeros. Additionally, the ability to consider particle trains as "signals" that can be sequentially modulated provides a mechanisms for information processing and computation functions, such as have been demonstrated with bubbles and droplets in microfluidic networks.

FIG. 6 shows one embodiment of an inertial focusing microchannel 12 including an expansion-contraction geometry to control particle spacing. Expansion-contraction channels enhance uniformity of inter-particle spacing in inertially ordered particle systems. Uniform spacing leads to uniform local particle concentration, bypassing Poisson distribution.

FIG. 7A-FIG. 7D show different shape of expansion/irregularity 34. FIG. 7A shows a channel with a trapezoidal irregularity 34 ($w_1$=25 mm, $w_2$=50 mm, L=3.2 mm, Tan θ=1/20). FIG. 7B shows a channel with an array of triangular irregularities 34 ($w_1$=25 mm, $w_2$=40 mm, L=60 mm, Tan θ=2/3). FIG. 7C shows a channel with an array of rounded/half circular irregularities 34 ($w_1$=25 mm, $w_2$=35 mm, L=60 mm). FIG. 7D shows a channel with an array of rectangular irregularities 34 ($w_1$=25 mm, $w_2$=35 mm, L=60 mm). Sudden expansion such as with rectangular shape expansion/irregularity 34 can lead to particle disorder. Particle ordering is maintained with Tan θ~1/10-1/20, where θ is the angle between a baseline surface 36 and the irregularity 34. (FIG. 6A). Further, arraying of expansion-contraction geometry, as in FIG. 7A-FIG. 7D, promotes ordering.

Figure 8B:
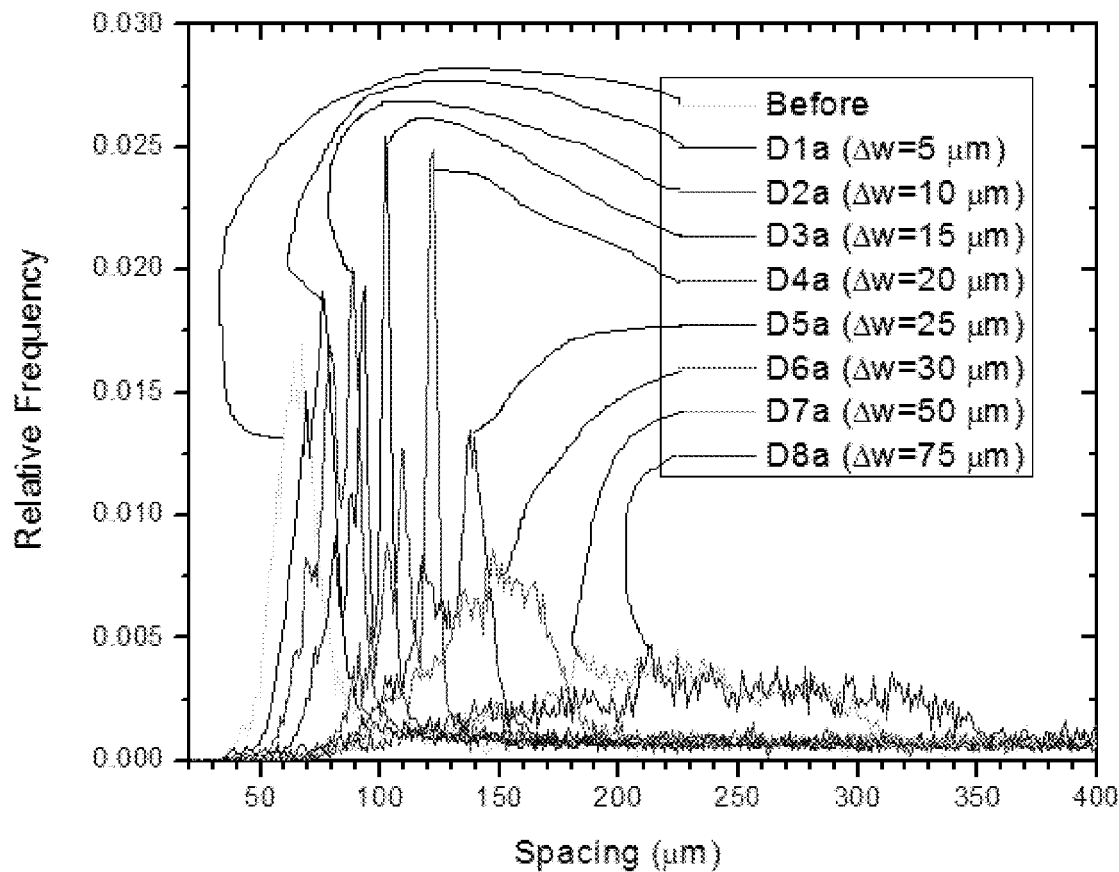
FIG. 8B is a histogram of the spacing of particles passing through the expansion regions in FIG. 8A.

In expansion-contraction channels with contracted section width ($w_1$) and expanded section width ($w_2$), good particle spacing control is achieved with a $w_2/w_1$ ratio<~2 (FIG. 8A and FIG. 8B). FIG. 8B plots the frequency of particles versus focus position for various expanded widths with a constant contracted width. The particles were 9.9 μm beads at approximately 0.5%. The flow rate was 80 μL/min.

Figure 9A:
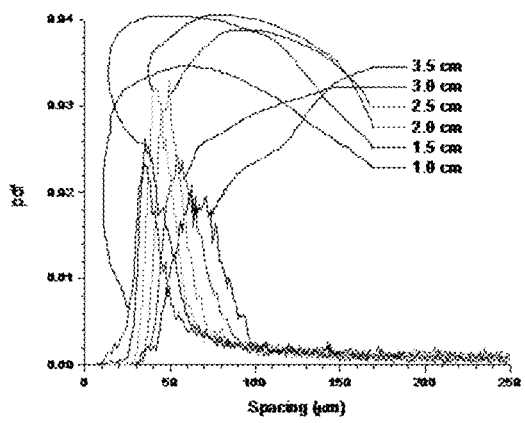
FIG. 9A and FIG. 9B are histograms of inter-particle spacing for flow length at a constant flow rate and flow rate at a constant flow length, respectively.
Figure 9B:
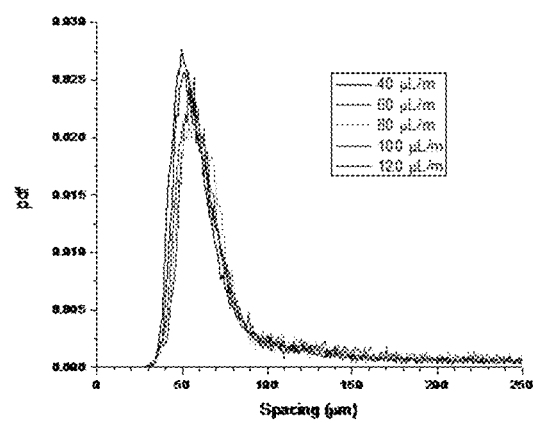
Figure 9C:
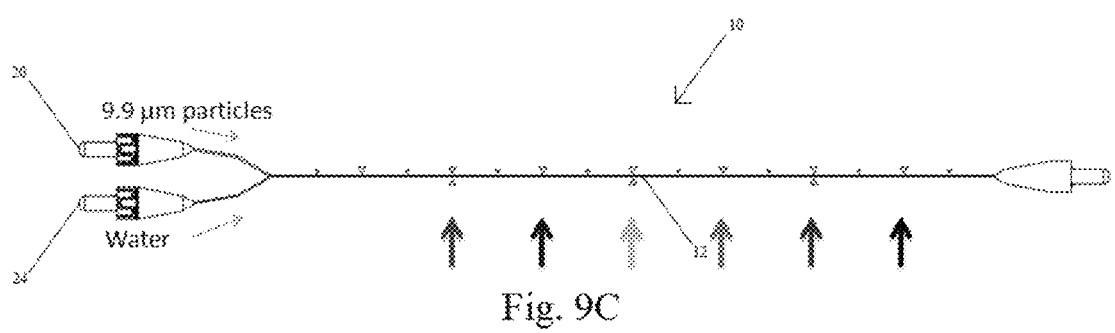
FIG. 9C and FIG. 10 are top schematic views of particle focusing systems having inertial focusing microchannels according to various embodiment of the invention.

FIG. 9 shows that inter-particle spacing increases with long travel length in a straight channel. This shows that there are no attractive particle-particle interaction after particles are settle to focusing positions. Average inter-particle spacing slowly increases along with flows. However, flow rate dependence is weak. FIG. 9A plots the frequency of particles versus inter-particle spacing for samples collected at increasing positions along the inertial focusing microchannel at a constant flow rate (60 µL/min). FIG. 9B plots the frequency of particles versus inter-particle spacing for samples flowed at increasing rates at a contact position along the inertial focusing microchannel (3 cm).

Figure 10:
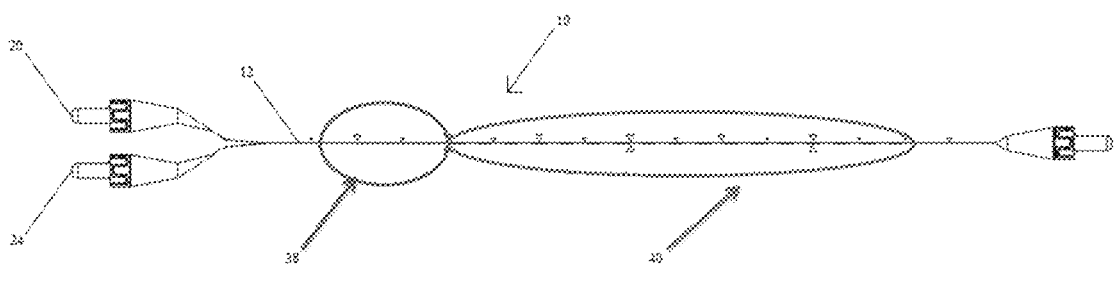

FIG. 10 shows a dual-inlet co-flow system 10 including an inertial focusing microchannel 12 having a first (shorter) irregularities region 38 and a second (longer) irregularities region 40. The microchannel 12 is approximately 25 mm wide, approximately 75-100 mm tall, and approximately 4 cm long channel. Dual-inlet co-flow produces a 1-D ordered particle stream. The shorter irregularities (short expansion-contraction) array in the first irregularities region 38 promote rapid particle ordering. The longer expansion-contraction array in the second irregularities regions 40 promote uniform spacing for frequency tuning. This set of microchannel geometries is designed for: (1) enhancing ordering of particles; (2) manipulating inter-particle spacing; and (3) reducing voids (volume with no particles).

FIG. 11 and FIG. 12 illustrate designs for maintaining particle focus in expanding regions. To achieve narrow particle stream at expansion channel, wall-particle interactions should be considered. Expansions with steps (FIG. 11C and FIG. 11D) reduce wall-particle interactions and result in narrower and more focused particle streams. In FIG. 11E, N is the number of particle measured (for same time interval) and 6 is the standard deviation of y positions. FIG. 12A-FIG. 12D shows the transformed t-y images of particles stream in the corresponding expanding regions depicted in FIG. 11A-FIG. 11D.

Figure 13:
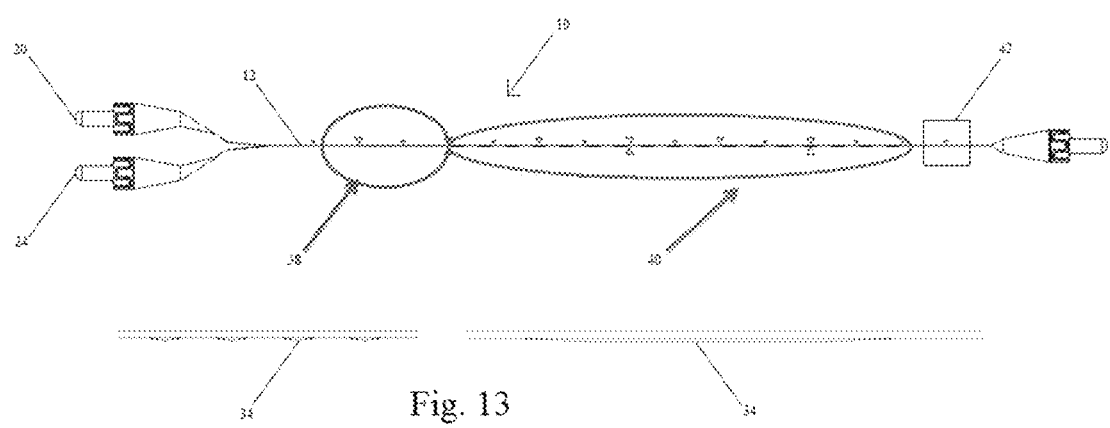
FIG. 13 is a top schematic view of a cytometer having an inertial focusing microchannel according to one embodiment of the invention.

FIG. 13 depicts a flow cytometer including the dual-inlet co-flow system 10 of FIG. 11. In addition, a particle analyzer 42 has been disposed at a distal end of the inertial focusing microchannel 12. This device is broadly useful for flow cytometry and the analyzer 42 can be selected to be able to conduct all of the flow cytometer analysis known to one skilled in the art (e.g., imaging, fluorescence intensity and peak width, forward, and side scatter). The particle analyzer is position to be able to detect changes in the lateral position of particles flowing through the cytometer (along the cross-sectional width of the microchannel 12).

The dynamics of particle-particle interactions affect particle position and focusing in finite-Reynolds-number channel. Relevant aspects of these interactions include nonlinearity and the absence of time reversibility in many phenomena. High-speed imaging reveals diverse particle dynamics, including oscillatory motion, through which stable self-assembled pairs are formed. Normally the particles in the channel flow simply bypass one another or interact unstably, i.e. repelled to infinity, due to viscous wakes reflected off nearby walls. Fluid inertia acts to stabilize the system keeping the particles organized at finite and precise spacing. Reversing wakes are a component of particle-particle interactions leading to cross-streamline movement near microscale channel walls with implications across various fields concerned with particle-laden flows. Finally, the self-organized particle system described above displays characteristics such as wave propagation and irreversible frequency tuning, which have scientific and practical significance.

While embodiments have been shown and described, various modifications may be made without departing from the scope of the inventive concepts disclosed herein. The invention(s), therefore, should not be limited, except to the following claims, and their equivalents.

The invention claimed is:

1. A method of increasing inter-particle spacing between particles in a focused stream of particles contained within a fluid comprising:

providing a microfluidic device formed in a substrate and comprising at least one inlet channel operatively coupled to a fluid containing a source of particles suspended therein, a focusing microchannel disposed in the substrate and connected to the at least one inlet, an expansion region disposed in the substrate downstream of the focusing microchannel, a contraction region disposed in the substrate downstream of the expansion region; and a pressure/flow source configured to drive the fluid containing the source of particles through the focusing microchannel;

focusing the particles in the fluid in the focusing microchannel to form a substantially axially aligned particle stream at one focusing position having an inter-particle spacing ($d_b$);

flowing the substantially axially aligned particle stream focused at the one focusing position past the expansion region, whereby the inter-particle spacing decreases in the expansion region to below a threshold value to initiate a viscous repulsive interaction between adjacent particles, wherein the viscous repulsive interaction increases the inter-particle spacing of adjacent particles in the expansion region; and flowing the particles past the contraction region, whereby the inter-particle spacing increases in the contraction region, wherein the inter-particle spacing is increased to a value ($d_a$) such that $d_a > d_b$.

2. The method of claim 1, wherein focusing comprises flowing the fluid containing a source of particles through the focusing microchannel with a Reynolds number >1.

3. The method of claim 1, wherein the threshold value is about 100 µm.

4. The method of claim 1, wherein the expansion region comprises a microchannel with an expansion in a width dimension in a plane of the substrate.

5. The method of claim 4, wherein the expansion width dimension expands between 1.4 and 2-fold of the width dimension of the focusing microchannel.

6. The method of claim 1, wherein the contraction region comprises a microchannel with a contraction in the width dimension in the plane of the substrate.

7. The method of claim 6, wherein the contraction width dimension is substantially equal to a width dimension of the focusing microchannel.

8. The method of claim 1, wherein the expansion region has a length of at least 2 mm.

9. The method of claim 1, wherein the increased inter-particle spacing ($d_a$) is substantially uniform for the particles.

10. The method of claim 1, further comprising flowing the particles having increased inter-particle spacing ($d_a$) into a flow cytometer.

* * * * *